United States Patent [19]

Jones et al.

[11] Patent Number: 4,826,789

[45] Date of Patent: May 2, 1989

[54] POROUS INORGANIC MATERIALS

[75] Inventors: Thomas R. Jones; Caryl Gould, both of Cornwall, United Kingdom

[73] Assignee: ECC International Limited, Great Britain

[21] Appl. No.: 22,944

[22] Filed: Mar. 6, 1987

Related U.S. Application Data

[63] Continuation-in-part of Ser. No. 698,323, Feb. 5, 1985, abandoned.

[30] Foreign Application Priority Data

Feb. 9, 1984 [GB] United Kingdom ................. 8403395

[51] Int. Cl.$^4$ ...................... C04B 38/04; C12N 11/14; C12N 5/00
[52] U.S. Cl. ...................................... 501/8.0; 501/68; 435/176; 435/240.23
[58] Field of Search ........................... 501/5, 6, 68, 80; 428/402, 403, 404; 523/218, 219; 435/176, 246.23

[56] References Cited

U.S. PATENT DOCUMENTS

| | | | |
|---|---|---|---|
| 2,536,122 | 1/1951 | Beriorelli et al. | 423/131 |
| 3,951,677 | 4/1976 | Jacobson et al. | |
| 4,389,385 | 6/1983 | Ramsay | 423/338 |
| 4,415,631 | 11/1983 | Schotijser | 428/404 |
| 4,517,241 | 5/1985 | Alfert | 428/404 |

FOREIGN PATENT DOCUMENTS

| | | |
|---|---|---|
| 22146 | 5/1972 | Australia . |
| 0130734 | 1/1985 | European Pat. Off. . |
| 0155669 | 9/1985 | Fed. Rep. of Germany . |
| 1213093 | 11/1970 | United Kingdom . |
| 1457890 | 12/1976 | United Kingdom . |

OTHER PUBLICATIONS

Chem. Abstracts, 98, No. 14, Apr. 1983, p. 143, No. 109877r.

Primary Examiner—Allan M. Lieberman
Attorney, Agent, or Firm—Klauber & Jackson

[57] ABSTRACT

A particulate porous material suitable for use as a high surface area column packing material comprises particles substantially all of which are not smaller than 5 micrometers and not larger than 1 millimeter in diameter, and each particle is in the form of a substantially cellular body and consists predominantly of an open, three-dimensional matrix of crystals of mullite which define between them interconnecting pores having a width in the range of from 5 nanometers to about 2 micrometers. The particles can be coated with a reactive layer. There is also disclosed a process for producing the particulate porous material wherein a particulate product comprising particles substantially all of which are between 5 micrometers and 1 millimeter in diameter and consisting predominantly of a mixture of mullite crystals and silica is treated with a concentrated aqueous solution of an alkali metal hydroxide at a temperature of at least 50° C.; and the treated particulate product is then washed, dewatered and dried. The particulate porous material may be used as a packing material for a chromatographic or ion exchange column, or for performing biochemical separations, and is particularly useful for immobilizing biological components such as biological macromolecules or biological cells.

10 Claims, 11 Drawing Sheets

POROUS INORGANIC MATERIALS

This is a continuation-in-part of application Ser. No. 698,323, filed Feb. 05, 1985, now abandoned.

BACKGROUND OF THE INVENTION

This invention relates to particulate porous materials which contain discrete internal cavities and, more particularly but not exclusively, is concerned with such materials which are suitable for use as column packing materials or supports for enzymes, whole cells or biological polymers, and with a process for preparing the same.

Mullite is an aluminosilicate material which exists in the form of needle-shaped crystals: it has a variable chemical composition but is generally represented by the formula $3Al_2O_3.2SiO_2$. Although mullite occurs naturally, it is usually obtained by heating bauxite with clay or sillimanite. It is presently used as a refractory.

DESCRIPTION OF THE PRIOR ART

U.S. Pat. No. 4628042, issued Dec. 9, 1986 and European patent application No. 0130734, published on Jan. 9, 1985, each disclose porous mullite articles which can be obtained in the form of bodies, which bodies have both the size and shape useful for catalytic and sorptive applications, specifically the oxidation of carbon monoxide or hydrocarbons, as a hydroprocessing catalyst or as a catalyst for asphalt residual processing. It is stated that the mullite articles should have a high surface area, e.g. greater than about 15 $m^2/g$; a high pore volume, e.g. greater than about 0.22 cc/g; and a high concentration of pores in the range of 150 to 350 Angstroms.

In the prior art, the desired mullite articles are obtained by calcining kaolin clay and subsequently leaching free silica from the calcined mass to leave porous mullite. It is stated that calcination at or above 1350° C. causes excessive sintering which reduces porosity of the calcined body and extends the required leaching time.

SUMMARY OF THE INVENTION

According to one aspect of the present invention there is provided a particulate, porous material wherein substantally all the particles of the material are not smaller than 5 micrometers and not larger than 1 millimeter in diameter and wherein each particle is in the form of a substantially cellular body and consists predominantly of an open, three-dimensional matrix of crystals of mullite which define between them interconnecting pores having a width in the range of from 5 nanometers to about 5 micrometers.

The substantially cellular body may be a substantially spherical hollow particle having an internal cavity with a size in the range of from 1 micrometer to 500 micrometers. Alternatively, the cellular body may be a substantially rigid foam which comprises a plurality of internal cavities each having a size in the range of from 1 micrometer to 500 micrometers.

The particulate porous material of the invention may be used inter alia as a packing material for a chromatographic or ion exchange column, or for performing biochemical separations.

In order to be suitable for the above applications the particulate material should have a high proportion of interconnected pores of sufficient width that large molecules, such as biological and synthetic polymer molecules, can penetrate easily and rapidly into the particles. The interconnecting pores, having a width in the range of from 5 nanometers to 5 micrometers may also accommodate some types of prokaryotic cells whilst eukaryotic cells may be immobilised within the hollow spherical particles or the rigid foam.

It is also important that all, or substantially all, of the particles are not smaller than 5 micrometers, in order to ensure that a column packed with the material has a good flow velocity, and are not larger than 1 millimeter, in order to ensure that a column packed with the material has a good surface area per unit weight. It is also desirable that the exposed surface of the particles should be provideded with a reactive layer for the purpose of chromatography or ion exchange. Such a reactive layer may be hydrophilic or hydrophobic or may comprise a mixture of hydrophilic or hydrophobic groups. The porous particulate material should also preferably have good mechanical strength, especially good resistance to crushing and abrasion; it should be resistant to chemical attack by both alkalies and acids, and ideally it should also be able to withstand elevated temperatures and thermal shock. The particulate porous material of the present invention meets these requirements. It has also been found tha the particulate porous material of the invention can be used as a support for enzymes or as a filler for paper, paints, plastics or rubber compositions.

The crystals of mullite are preferably substantially uniform in size, preferably having a length in the range of from 1 micrometer to 5 micrometers, and the interconnecting pores preferably have a width no greater than 2 micrometers and a width preferably no smaller than 0.1 micrometers, preferably no smaller than 0.5 micrometers more.

The specific surface area of the particulate porous material of the present invention, as determined by the B.E.T. nitrogen adsorption method, is less than 10 $m^2$ per gram, and usually is less than 7 $m^2$ per gram.

According to another aspect of the invention there is provided a process for producing a particulate porous material which process comprises: (a) preparing a particulate product comprising particles substantially all of which are between 5 micrometers and 1 millimeter in diameter, each particle being in the form of a substantially cellular body and consisting predominantly of a mixture of mullite crystals and silica, by heat-treating by soak calcination an aluminosilicate material having an $SiO_2.Al_2O_3$ molar ratio of at least 0.75:1 at a temperature in the range of from 1300° C. to 1800° C. for at least one hour; (b) treating the particulate product formed in (a) with a concentrated aqueous solution of an alkali metal hydroxide at a temperature of at least 50° C. whereby the silica is removed to leave mullite crystals which define between them interconnecting pores having a width in the range of from 5 nanometers to 5 micrometers; (c) washing the alkali metal hydroxide-treated particulate product formed in (b) until the washing medium is substantially free of silicate and alkali metal ions; and (d) dewatering and drying the washed product obtained in (c) to obtain the desired particulate porous material.

The aluminosilicate material to be heat treated is prepared in the form of substantially cellular bodies. Each of the substantially cellular bodies may be a substantially spherical hollow particle, prepared by spray-drying an aqueous suspension of the aluminosilicate material. Alternatively, the aluminosilicate material to be heat treated may be in the form of a substantially cellular body prepared by foaming an aqueous suspension of the aluminosilicate material which is permitted to dry and set to a substantially rigid foam comprising a plurality of internal cavities.

In the case of spray drying, the thus-formed hollow spheres, before calcination, may be produced with openings communicanting with the internal cavities. Alternatively, the spray dried particles may be produced with a wall which is thinned at certain regions which regions, after calcination, are held together by silica. On leaching, the thinned regions will break to yield openings into the internal cavity. This phenomenon may also occur in the preparation of a porous particulate material by the foaming method.

It is important that the internal cavities in the particles have sizes in the range from 1 micron to 500 microns in order to accommodate the penetration and immobilisation of a variety of prokaryotic and eukaryotic cells whose diameters are in the range from 0.5 to 3 microns, and up to 40 microns, respectively.

The prokaryotic cells may be able to penetrate the particles through the array of mullite crystals. However, to enable eukaryotic cells to enter the internal cavities within the porous material, it is important that openings are provided in the particle wall in the case of the hollow spherical particles and, in the case of a rigid foam, that openings between internal cavities in the foam and the outside of the particle are provided. Such openings into the internal cavities should be at least 5 micrometers in diameter, but may be up to fifty micrometers in diameter.

A serious problem in biotechnology is the retention of eukaryotes and prokaryotes such as bacteria, moulds and yeasts in reactors. The loss of cellular material has to be minimised as far as possible in order to increase the efficiency of the biotechnological process and thus reduce reactor volume and residence time.

Immobilised cells can be described as cells which are physically confined or localised in a certain defined region of space with retention of their catalytic activities and which can be used repeatedly and continuously (see Chibata, I. (1978) "Immobilized enzymes. Research and Development", John Wiley and Sons, New York; P. 7. which is incorporated herein by reference). The study of immobilised cells to produce chemicals has expanded rapidly in the last decade (see Abbott, B. J. (1977) Immobilized cells. "Annual Reports on Fermentation Processes 1", Perlman, D. (ed.), Academic Press, London, pp. 205–233; Abbott, B. J. (1978) Immobilized cells, "Annual Reports on Fermentation Processes 2", Perlman, D. (ed.), Academic Press, London, pp. 91–123; Messing, R.A. (1980) Immobilized microbes, "Annual Reports on Fermentation Processes 4", Tsao, G. T. (ed.), Academic press, London, pp. 105–121; Chibita, I. and Tosa, T. (1981) Use of immobilized cells. Annu. Rev. Biophys, Bioeng. 10:197-26; Fukui, S. and Tanaka, A. (1982) Immobilized microbiol cells. Annu. Rev. Microbiol. 26:145–172; and Bucke, C. (1983) Immobilized cells. Phil. Trans. R. Soc. Lond. B 300:369–389. These reviews are incorporated herein by reference). More recently, interest in the application of immobilised living cells to the synthesis of biologically-active macromolecules, such as antibiotics and enzymes has increased.

As the utility of cell immobilisation with respect to re-usability becomes proven, efforts have been directed towards better means of immobilisation. The most common method of cell immobilisation on the small scale is known as the gel entrapment technique. The entrapped cell may suffer from one or other of the drawbacks of low cell loading, poor mechanical strength, sensitivity to phosphate or ionic substrates or toxicity of functional groups.

The requirements of a high quality biosupport for cell immobilisation can therefore be outlined as follows:
(i) loss in activity on immobilisation should be low;
(ii) high cell loading should be possible;
(iii) substrate and products should be able to diffuse freely through the biosupport
(iv) the biosupport should have a good mechanical strength and good resistance to abrasion;
(v) the biosupport should be thermally and chemically stable;
(vi) regeneration of the biosupport should be possible; and
(vii) the biosupport should offer a high contact area.

The porous materials in accordance with this invention are particularly suited to application as biosupports.

Thus, according to another aspect of this invention, there is provided a biological support comprising a particulate porous material wherein substantially all the particles of the material are not smaller than 5 micrometers and not larger than 1 millimeter in diameter and wherein each particle is in the form of a substantially cellular body and consists predominantly of an open, three-dimensional matrix of crystals of mullite which are substantially uniform in size and define between them interconnecting pores having a width in the range of from 5 nanometers to about 5 micrometers.

The present invention also provides a particulate porous material wherein substantially all the particles of the material are not smaller than 5 micrometers and not larger than 1 millimeter in diameter and wherein each particle is the form of a substantially cellular body and consists predominantly of an open, three-dimensional matrix of crystals of mullite which define between them interconnecting pores having a width in the range of from 5 nm to about 5 micrometers, each particle having immobilized within the structure thereof a biological component selected from the group consisting of: biological macromolecules and biological cells.

If the biological component is an enzyme or a prokaryotic cell, it may be immoblized within the interconnecting pores of the matrix of mullite crystals. However, if the biological component is an eukaryotic cell, it will be immobilized within an internal cavity of the substantially cellular particles.

Suitable aluminosilicate starting materials include kyanite, sillimanite, and andalusite, all of which can be represented by the chemical formula $Al_2O_3.SiO_2$; dumortierite which can be represented by the chemical formula $8Al_2O_3.B_2O_3.6SiO_2.H_2O$; clay minerals of the kandite group which can be represented by the chemical formula $Al_2O_3.2SiO_2.2H_2O$; and pyrophillite which can be represented by the chemical formula $Al_2O_3.4SiO_2.H_2O$. Other possible aluminosilicate starting materials include topaz, pinite, illite and clay minerals of the smectite class. It is also possible to use as the aluminosilicate starting material a mixture of an alumina-rich material and a silica-rich material, a chemically precipitated aluminosilicate or a mixture of substantially pure alumina and silica, provided that the molar ratio $SiO_2:Al_2O_3$ is at least 0.75:1, and preferably at least 1:1 in each case. We have found clay minerals of the kandite class, namely kaolinite, dickite, nacrite and halloysite to be especially suitable, and in particular kaolin clay which consists predominantly of kaolinite.

The aluminosilicate starting material may be prepared as described above by spray drying or by foaming. The aluminosilicate material is then heat-treated by the process known as soak calcination in, for example, a tunnel kiln, in which case the starting material is exposed to a temperature in the range from 1300° C. to 1800° C. for at least 1 hour. Preferably, the starting material is heat treated at a temperature greater than 1350° C. but not greater than 1600° C. for a time in the range of from 5 hours to 24 hours. After heat-treatment by soak calcination the mixture of mullite crystals and silica is comminuted and subjected to one or more particle size separations by sieving, air classification and/or centrifugal or gravitational sedimentation.

If in step (b) the silica in the heat-treated mixture of mullite crystals and silica is to be readily soluble in the concentrated aqueous solution of an alkali metal hydroxide the aluminosilicate starting material should preferably contain from 1.5% to 2.5% by weight of $M_2O$ where M is sodium and/or potassium. If the starting material contains less than this amount of $M_2O$, the $M_2O$ content may be increased by adding an appropriate quantity of an $M_2O$-containing mineral, such as feldspar.

Preferably, the particulate product of step (a) has a narrow range of particle sizes. For example an especially advantageous product comprises particles substantially all of which are between 10 microns and 100 microns in size.

In step (b) the alkali metal hydroxide is most conveniently sodium hydroxide and the molarity of the alkali solution is preferably at least 3 M. Advantageously, the reaction between the particulate product of step (a) and the alkali metal hydroxide solution is performed at a temperature between 80° C. and the boiling point of the alkali metal hydroxide solution.

The purpose of step (b) is to dissolve substantially completely from the mixture of mullite and silica, the silica component which is generally present in a glassy form. After the silica has been removed by dissolution each particle consists predominantly of mullite needles joined together in the form of a three-dimensional lattice which has a high proportion of interconnecting voidage, the passages of which are relatively wide in relation to the width of the mullite needles.

In step (c) the alkali-treated particulate product of step (b) is preferably washed first with an alkaline solution weaker than that used in step (b) and then repeatedly with water until the washing medium is substantially free of silicate and alkali metal ions. The alkaline solution used in this washing procedure preferably has a molarity of 1 M or less.

The dry particulate product obtained on carrying out step (d) is found to have good mechanical properties when packed into a column for the purpose of, for example, chromatography or ion exchange. In particular the particles are resistant to crushing and abrasion and can withstand a high differential pressure between one end of the column and the other when a liquid is pumped through the column.

Sine the melting point of mullite is about 1810° C. the particulate product can be subjected to high temperatures for long periods without fusing or sintering, and it has been found that the material has good resistance to thermal shock, being able to withstand repeated quenching from 1200° C. to room temperature with no deleterious effect on its structure.

The particulate porous material is also able to withstand prolonged exposure to strong acids of pH 1 and strong alkalies of pH 14. Of the known comparable materials silica is soluble in strongly alkaline solutions and alumina and clays are attacked by strong acids.

The particulate porous material of the invention is readily coated with a reactive layer for the purposes of affinity chromatography or ion exchange, or biochemical separations. Examples of materials which can be coated on to the particulate porous material to form reactive layers include polymeric organic acids, polymeric quaternary ammonium compounds or polyacidic organic bases such as poyethyleneimines, which will form bonds directly with the surface of the mullite crystals. These materials possess both hydrophilic and hydrophobic groups and anion or cation exchange properties, which are useful in biological applications such as treating or separating proteins and whole cells. Other materials which can be coated directly on to the mullite crystals include thermoplastic materials such as polystyrene and polysaccharides. An example of a substituted polysaccharide material which has been found to form a useful reactive layer is "DEAE Dextran" which is a dextran substituted with pendant diethylamine ethyl groups: this provides a hydrophilic organic layer with anion exchange properties. The surface of the particulate porous material may be rendered hydrophobic, and be given an overall positive charge, by applying a coating of a quaternary ammonium compound which has at least one hydrocarbon radical with from 10 to 24 carbon atoms such as dimethyl-di(hydrogenated tallow)-ammonium chloride (2M2HT) or polydimethyldiallyl ammonium chloride. Alternatively, the particulate porous material may be given an overall negative charge by applying a coating of, for example, a polymer or co-polymer of a sulphonated acrylic acid or acrylamide.

Some materials can only be used to form reactive layers after the mullite crystals have first been coated with a bonding agent. Suitable bonding agents are substituted silanes, especially those comprising at least one hydroxy, hydroxyalkyl or alkoxy group for bonding with hydroxl groups on the surface of the mullite crystals and at least one aminoalkyl diazo or haloalkyl group for bonding with the material of the desired layer. An example of a suitable substituted silane is 3-aminopropyltriethoxysilane. Reactive layer materials which will form bonds with the substituted silane include nucleic acid bases, such as adenine which is very useful for the concentration and separation of nucleic acids, and polysuccinimide which is very suitable for affinity chromatography and for immobilising enzymes.

The particulate porous material of the invention is also useful as a filler for plastics materials or for natural or synthetic rubber compositions. The high production of interconnected voidage provides good mechanical keying between the polymeric material and the particulate material. The particulate material may, if desired, be pre-coated with a layer of a substituted silane, such as those described in British patent specification No. 2067535, in order to improve the chemical bonding between the polymeric material and the filler.

The particulate porous material of the invention is also useful as a filler for paper since the fine pores of the particulate material trap air and this increases the scattering of light and improves the whiteness of a composition in which the porous material is incorporated as a filler.

EMBODIMENTS OF THE INVENTION

The invention is illustrated by the following Examples.

EXAMPLE 1

(a) A Cornish kaolin clay having a particle size distribution such that 36% by weight consisted of particles having an equivalent spherical diameter smaller than 2 microns and 30% by weight consisted of particles having an equivalent diameter larger than 10 microns, and containing 1.7% by weight of $K_2O$, was fired in a tunnel kiln under conditions such that it was exposed to a temperature of 1500° C. for 8 hours.

Figure 1:
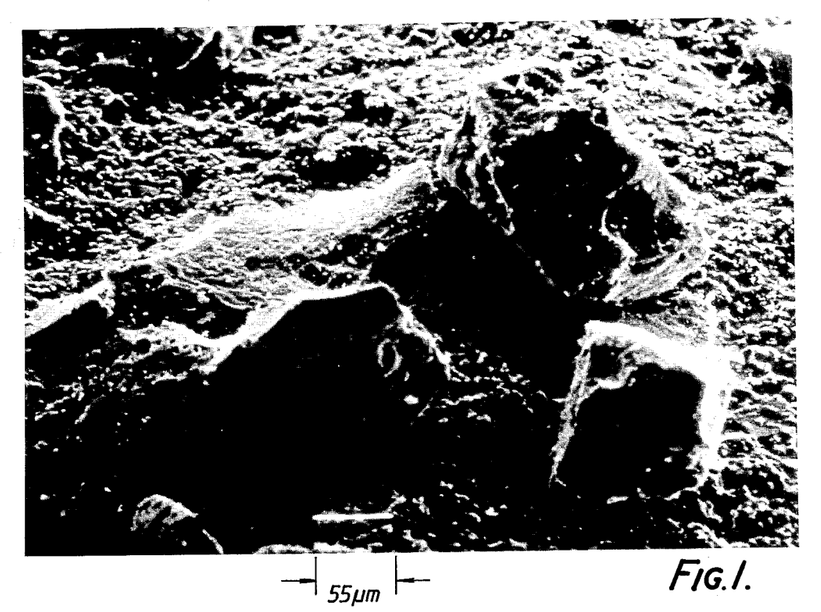
FIG. 1 shows particles comprising mullite crystals set in a glassy phase, as produced in Example 1(a)
Figure 2:
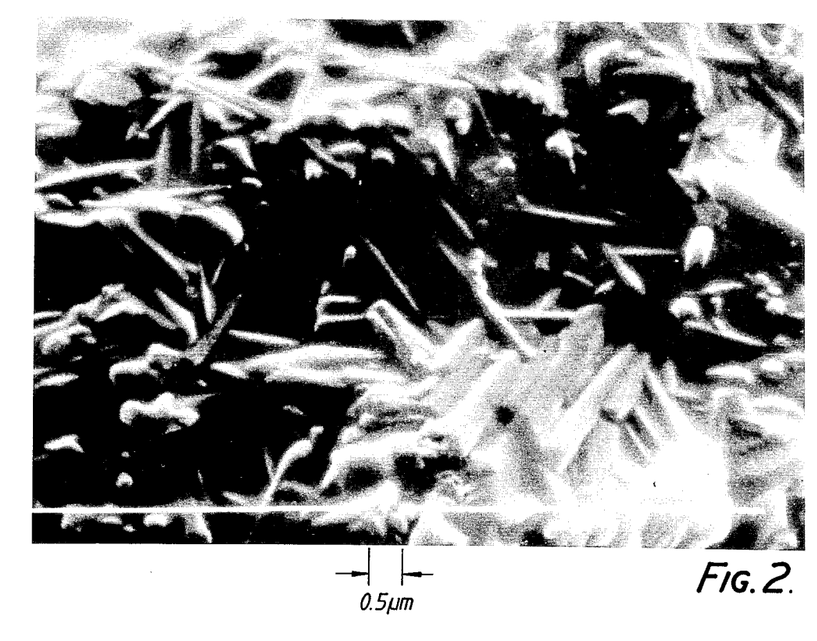
FIG. 2 is a close-up view of the mullite crystals in the particles shown in FIG. 1.

After cooling, the calcined material, which comprised mullite crystals set in a glassy silica phase (see FIGS. 1 and 2), was crushed and ground and the comminuted material was subjected to particle size separation by sieving. The material passing a No. 200 mesh British Standard sieve (nominal aperture 76 microns) was selected for further processing and was subjected to air classification to remove substantially all particles smaller than 10 microns.

(b) A sample of this particulate material was then boiled with 100 ml of 5 M sodium hydroxide for 1 hour. The liquor was then removed using a centrifuge.

(c) The solid material was washed with water, the washings also being removed by centrifuge.

(d) The washed solid material was then dried in an oven at 60° C. and the dry cake milled in a Janke and Kunkel laboratory analytical mill.

Atomic absorption analysis of the liquor and washings showed that the amount of silica removed was 26.4% by weight of the total weight of the heat-treated kaolin (the theoretical proportion of the glassy silica phase in heat-treated kaolin is 38.6% of the total weight).

Figure 3:
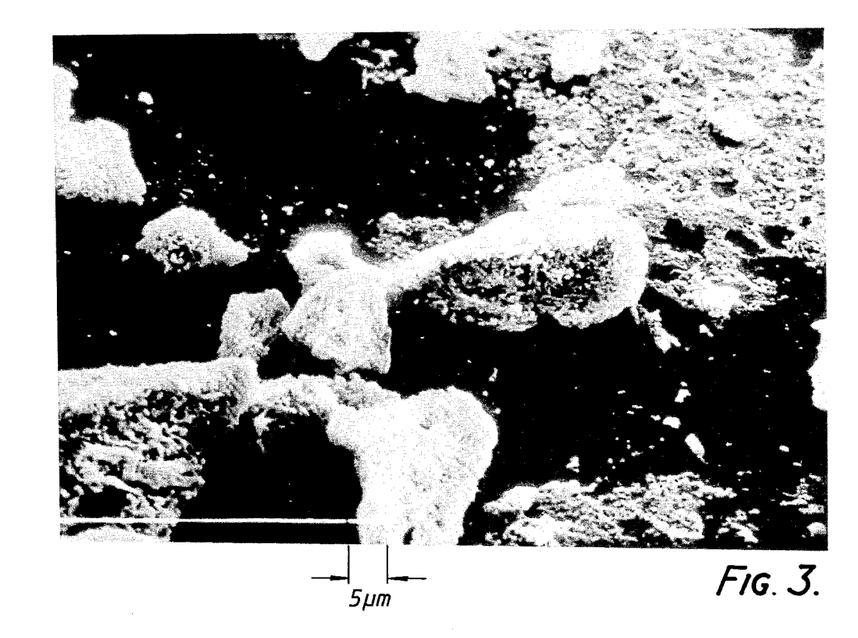
FIG. 3 shows similar particle to those shown in FIG. 1, with the glassy phase removed.
Figure 4:
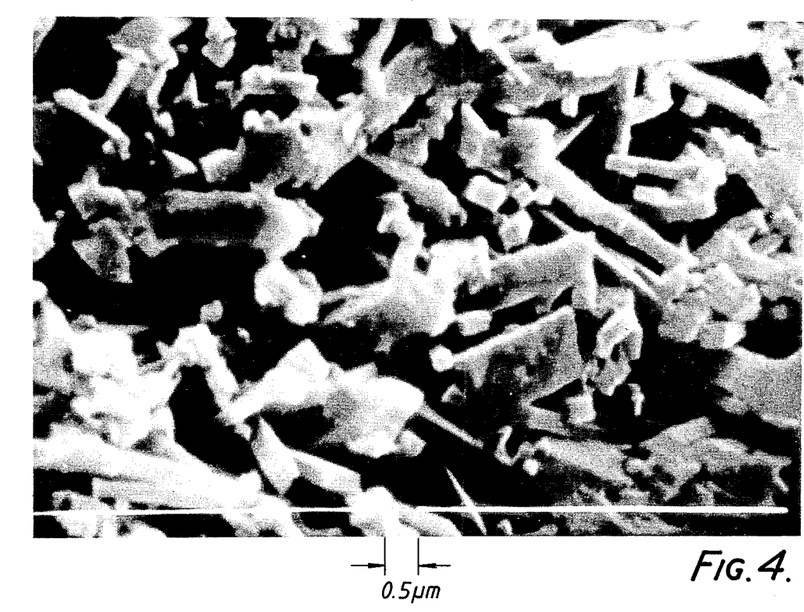
FIG. 4 is a close-up view of the mullite crystals in the particles shown in FIG. 3.

Scanning electron micrographs (see the accompanying FIGS. 3 and 4) show that the particles had a surface consisting of an exposed three dimensional matrix of mullite crystals in which substantially all of the mullite needles have a length in the range from 1 micron to 5 microns and define between them interconnecting pore 5 having a width in the range from about 5 nanometers to about 2 microns.

Figure 5:
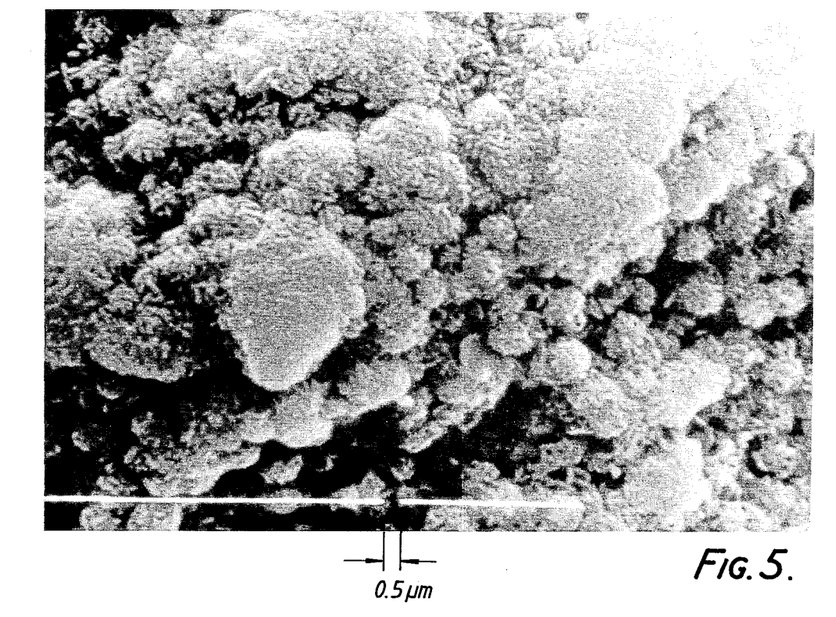
FIG. 5 shows the structure of a product prepared in the same manner as the product shown in FIGS. 3 and 4, except that calcination was conducted at a lower temperature.

By comparison, calcination of the same Cornish kaolin clay in a muffle furnace at 1200° C. for 1 hour, followed by crushing and sieving the cooled product, boiling with sodium hydroxide solution, washing with water, and drying as described under steps (b), (c), and (d) above produced material consisting of mullite needles all of which were smaller than 1 micron in length, typically 0.5 micron in length. The interconnecting pores in this material were typically from 10 nm to 100 nm (0.01 micron to 0.1 micron) in diameter as can be seen from FIG. 5.

EXAMPLE 2

Further 15 g samples of the particulate heat-treated kaolin prepared as described in Example 1 were boiled with 250 ml of 5M sodium hydroxide solution for varying lengths of time. In each case the liquor was separated and the alkali-treated material washed, dried and comminuted as described in Example 1. In each case the liquor and washings were subjected to atomic absorption analysis for silicon and the amount of silica removed, expressed as a percentage of the total weight of the heat-treated kaolin, was calculated in each case. The results obtained are set forth in Table 1 below:

TABLE 1

| Treatment time (hours) | Silica removed (% by weight) |
|---|---|
| ½ | 16.9 |
| 1 | 25.3 |
| 2 | 26.6 |
| 4 | 27.8 |

It can be seen that a significant proportion of the glassy silica phase was removed on boiling for only ½ hour and there is little advantage to be obtained by prolonging the time of boiling beyond 1 hour.

EXAMPLE 3

Further 15 g samples of the particulate heat-treated kaolin prepared as described in Example 1 were boiled for 1 hour with 250 ml of sodium hydroxide solutions of varying molarity. In each case the liquor was separated and the alkali-treated material washed, dried and comminuted as described in Example 1. In each case the liquor and washings were subjected to atomic absorption analysis for silicon and the weight of silica removed, expressed as a percentage of the total weight of the heat-treated kaolin, was calculated in each case. The results obtained are set forth in Table 2 below:

TABLE 2

| Molarity of NaOH Solution | Silica removed (% by weight) |
|---|---|
| 1 M | 11.5 |
| 3 M | 21.2 |
| 5 M | 25.3 |
| 7 M | 25.8 |

These results show that the molarity of the sodium hydroxide is preferably at least 3 M but that there is little advantage in increasing the molarity above 5 M.

EXAMPLE 4

Further 15 g samples of the particulate, heat-treated kaolin prepared as described in Example 1 were contacted for 1 hour with 250 ml of 5 M sodium hydroxide solution at varying temperatures. In each case the liquor was separated and the alkali-treated material washed, dried and comminuted as described in Example 1. In each case the liquor and the washings were subjected to atomic absorption analysis for silicon and the weight of silica removed, expressed as a percentage of the total weight of the heat-treated kaolin, was calculated in each case. The results obtained are set forth in Table 3 below:

TABLE 3

| Treatment temperatures °C. | Silicon removed (% by weight) |
| --- | --- |
| 25 | 0.07 |
| 50 | 1.3 |
| 75 | 4.7 |
| 100 | 25.3 |

These results show that it is important that the particulate heat-treated kaolin is contacted with sodium hydroxide solution at a temperature close to the boiling point of the solution.

EXAMPLE 5

(a) A sample of the same kaolin clay as was used in Example 1 was vigorously mixed with sufficient water to form a suspension containing 65% by weight of dry kaolin and 0.6% by weight, based on the weight of dry kaolin, of tetrasodium pyrophosphate as a dispersing agent. The resultant suspension was then diluted with water to a solids content of 40% by weight and was beaten for 10 minutes in a household food mixer in the presence of 1% by weight, based on the weight of dry kaolin, of the surfactant n-octylamine phosphate. The resultant wet foam was transferred to an open pan and dried for 16 hours at 80° C. in an oven and then heat-treated for 4 hours at 1000° C. to ensure that the foam was well set. The substantially rigid foam was fired in a tunnel kiln under conditions such that it was exposed to a temperature of 1500° C. for 8 hours. After cooling, the calcined material was lightly crushed and the comminuted material was subjected to particle size separation by sieving on a No. 200 mesh British Standard sieve.

(b) 1g of the particulate material passing through the sieve was boiled with 100 ml of 5 M sodium hydroxide for 1 hour. The liquor was removed using a centrifuge.

(c) The sample was washed with water, the washings also being removed by centrifuge.

(d) The washed sample was then dried in an oven at 60° C. and the dry cake milled in a Janke and Kunkel laboratory analytical mill. The product was tested as described in Example 8 below.

EXAMPLE 6

Figure 6:
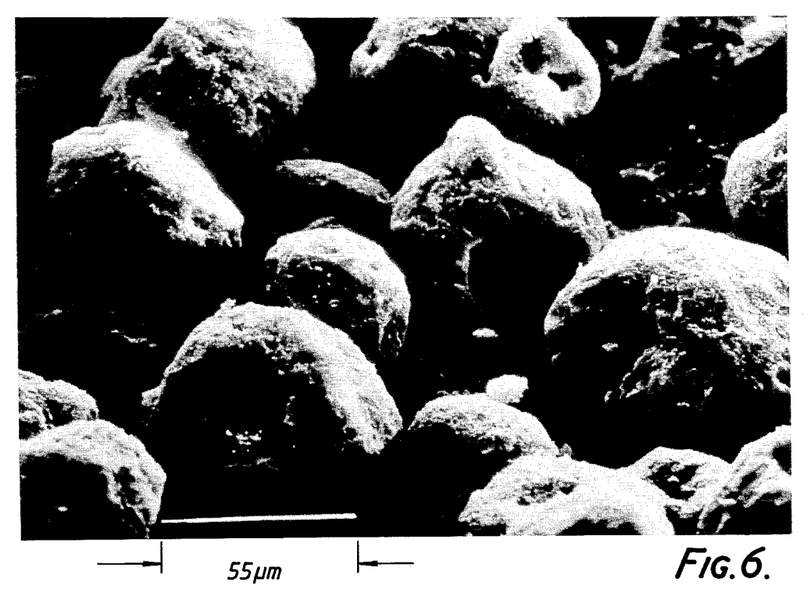
FIGS. 6 and 7 show a particulate product produced by spray drying a suspension of kaolin clay.
Figure 7:
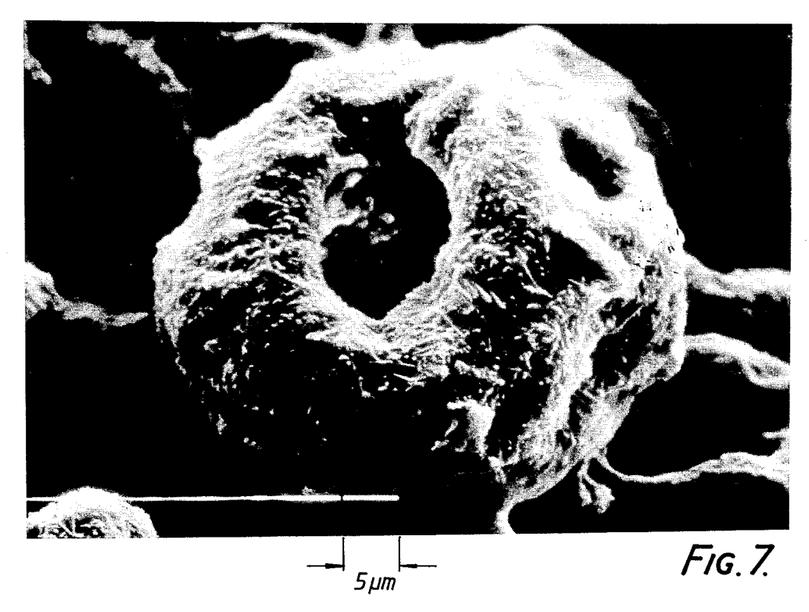

A sample of the same kaolin clay as was used in Example 1 was vigorously mixed with sufficient water to form a suspension containing 62% by weight of dry kaolin and 0.6% by weight, based on the weight of dry kaolin, of tetrasodium pyrophosphate. The resultant suspension was then fed at a rate of approximately 1 liter per minute to a laboratory spray dryer operating at an inlet temperature of 380° C. and an outlet temperature of 175° C. The dried product which was in the form of substantially spherical hollow bodies of substantially uniform diameter of about 50 microns (see FIGS. 6 and 7) was fired in a tunnel kiln under conditions such that it was exposed to a temperature of 1500° C. for 8 hours.

Figure 8:
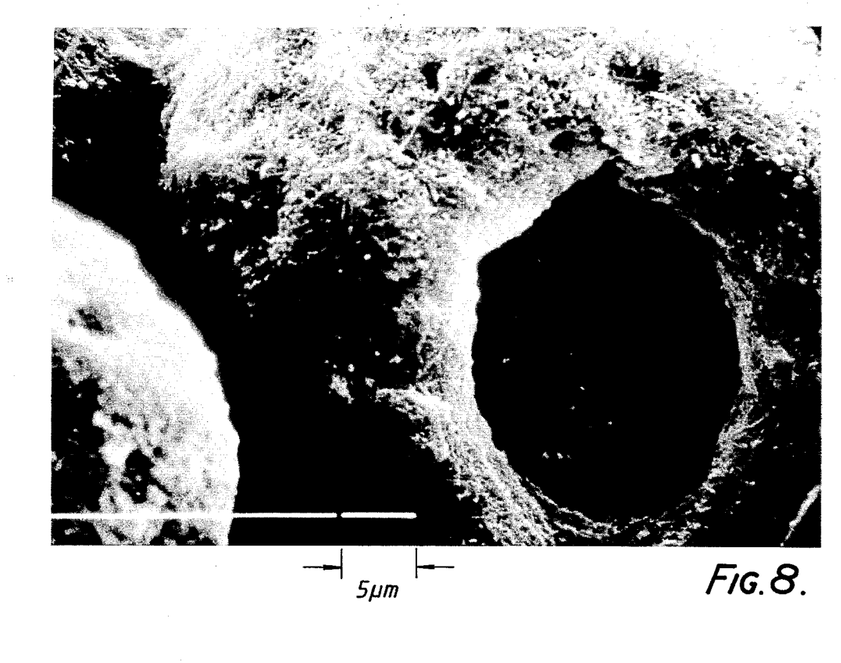
FIGS. 8 and 9 show a particulate product produced by removing the glassy silica phase from the particles shown in FIGS. 6 and 7.
Figure 9:
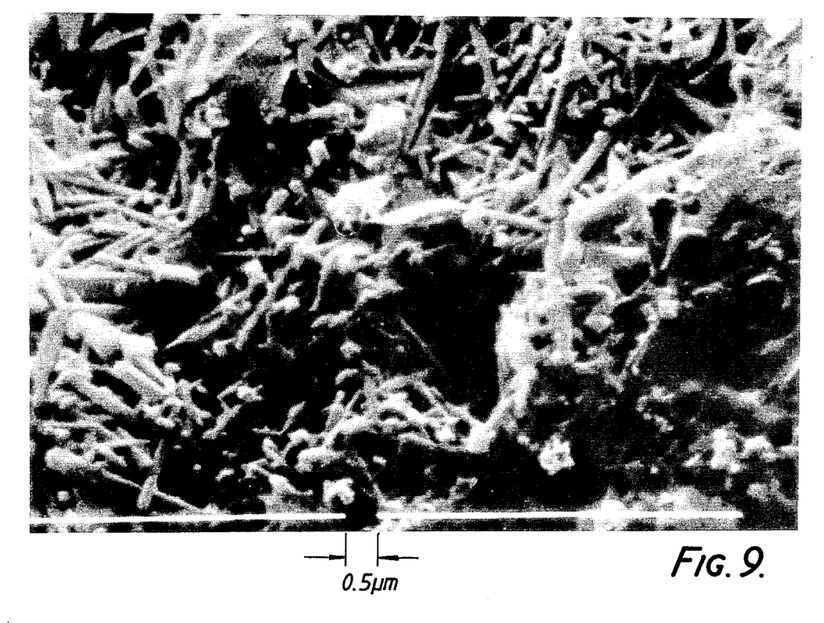

After cooling, the calcined material was lightly crushed to separate the spheres which had become fused together during the firing and the crushed material was divided into two portions A and B. Portion A was reserved for further testing as described in Example 8 below, while 1 g of Portion B was treated with sodium hydroxide under identical conditions to those described in Example 5 and the treated material was centrifuged, washed, dried and milled in the same way to produce a porous particle containing a large internal cavity as is shown in FIGS. 8 and 9.

Figure 10:
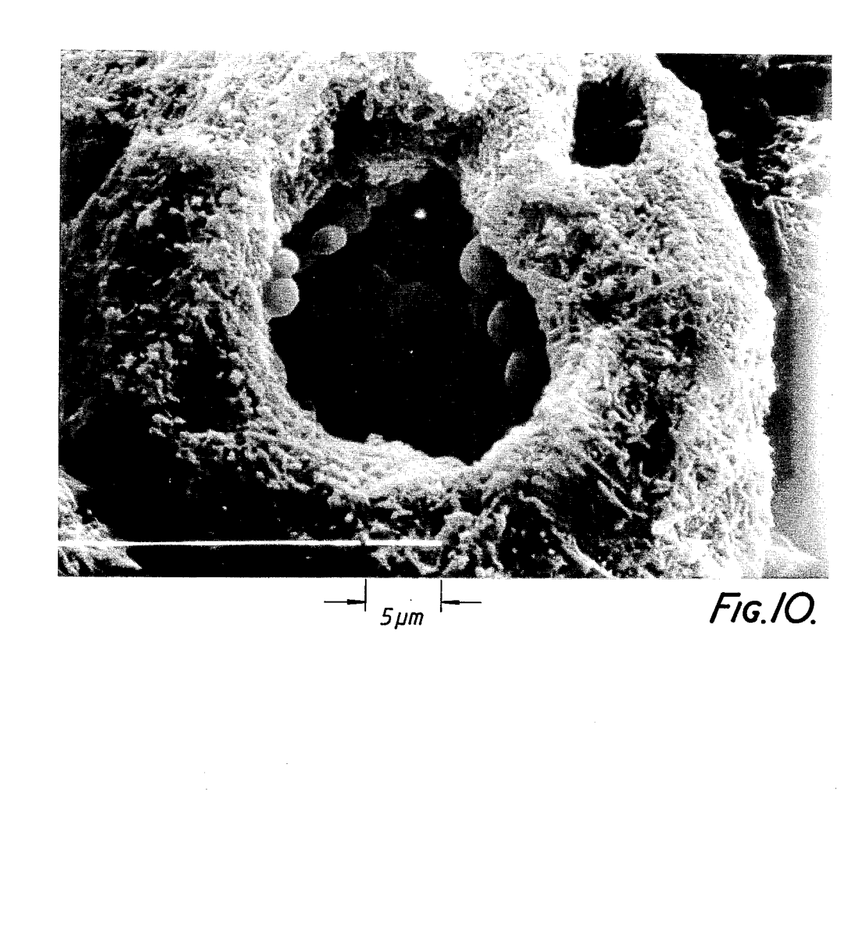
FIGS. 10 and 11 each show a particle similar to those shown in FIGS. 8 and 9, having a number of yeast cells immobilised thereon.
Figure 11:
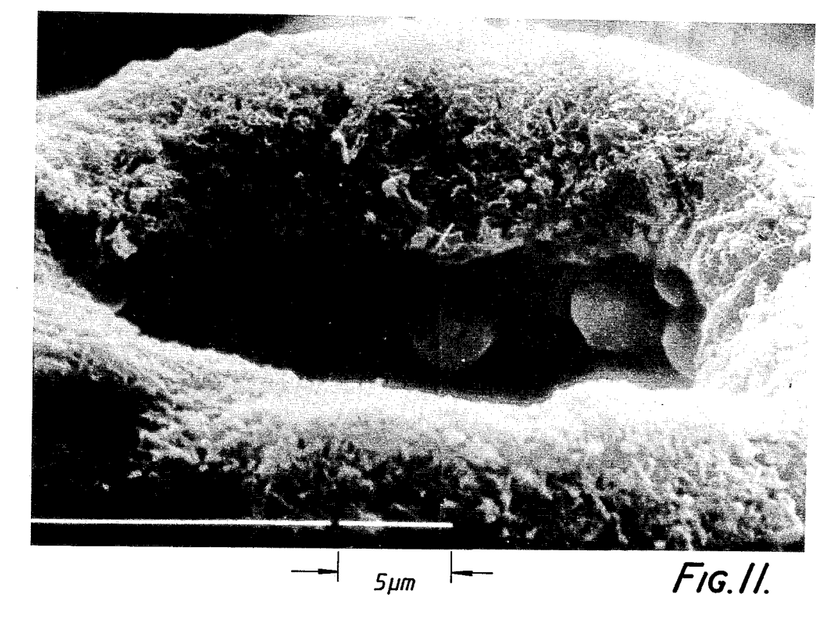

The hollow spheres produced may be used as a biological support on which a biological component may be immobilized. FIGS. 10 and 11 each show a substantially spherical mullite particle of this invention having a large internal cavity in which a number of yeast cells have been immobilized. To produce the structures of FIGS. 10 and 11, a medium containing yeast cells may be passed through a mass of the hollow particles of this invention. On passing through the mass of particles a number of the yeast cells become entrapped in the large internal cavities of the particles and become attached to the inside wall of the hollow particle. In the relatively calm environment of the internal cavity, the yeast cells are not readily disturbed.

EXAMPLE 7

The particulate mullite product of Example 1 was mixed with water to form a suspension containing 10% by weight of dry solids and portions of this suspension were mixed with varying quantities of an aqueous solution, at a temperature of 60° C., containing 10% by weight of the quaternary ammonium compound, dimethyl di-(hydrogenated tallow) ammonium chloride (2M2HT). The mixture was stirred at a temperature of 60° C. for half an hour after which the suspension was filtered and the cake washed with water and dried.

0.5 g of each of the dried products, which consisted of particulate mullite coated with varying amounts of 2M2HT, was mixed with 50 ml of deionised water for 5 minutes in an ultrasonic bath to ensure homogeneity of the suspension. The suspension was then further diluted with deionised water to a solids content of 0.05% by weight and a sample of the very dilute suspension was tested under the microscope in a thin rectangular electrophoretic cell with a potential difference of 80 V between the two electrodes.

The mobility $\mu_E$ of particles in the suspension, or the velocity in cm.s$^{-1}$ under a potential gradient of 1 V.cm$^{-1}$, was determined by measuring the time in seconds taken for a particle to traverse one square of the grid of the microscope. Twenty measurements of the time were made for each sample of suspension. the polarity of the electrodes being reversed after each measurement, and the mean value of the time was used to calculate the value of the velocity $V_E$ of the particles.

The mobility of the particles was calculated from the formula:

$$\mu_E = V_E/X$$

where X is the potential gradient in V.cm$^{-1}$.

The zeta potential, or the difference in potential between the immovable liquid layer attached to the surface of a solid phase and the movable part of the diffuse layer in the body of the liquid, was then calculated from the formula: ps $$\zeta = 4\pi\eta\mu_e/\epsilon$$

where η is the viscosity at the operating temperature, and ε is the dielectric constant, of the aqueous medium. The results are set forth in Table 4 below:

TABLE 4

| Particulate Material | meq.2M2HT per 100 g of particulate | Mobility (cm.s$^{-1}$) | Surface charge | Zeta potential (mV) |
|---|---|---|---|---|
| Ex.1-not NaOH treated | 0 | 4.50 | — | −58.1 |
| Ex.1-NaOH treated | 0 | 3.43 | — | −44.3 |
| " | 1 | 3.24 | — | −41.9 |
| " | 3 | 3.03 | — | −39.1 |
| " | 5 | 2.42 | — | −31.9 |
| " | 8 | 5.03 | + | +64.9 |
| " | 10 | 5.01 | + | +64.6 |

These results show that the negative charge on the surface of the particulate material is neutralised when the quantity of 2M2HT adsorbed on the surface has a value between 5 and 8 milliequivalents of 2M2HT per 100 g of the particulate material. The surface of the particulate material was found to have a significantly hydrophobic nature when the quantity of 2M2HT adsorbed was 5 milliequivalents per 100 g of particulate material.

EXAMPLE 8

The degree of adsorption of protein to the surface of various particulate materials in accordance with the invention was investigated by adding 1 g of particulate material to 15 ml of an aqueous solution containing 100 ppm of myoglobin and subjecting the mixture to mild agitation in the form of a gentle tumbling action for 18 hours to allow equilibrium to be reached. The mixture was then allowed to stand for 5 hours and centrifuged for 5 minutes at 3000 rpm to separate the particulate material from the solution of unadsorbed protein. The protein content of the initial solution and of the solution of unadsorbed protein separated by the centrifuge were determined by ultra violet spectrophotometry and the difference between the two measurements gave a measure of the quantity of myoglobin in milligrams which was adsorbed by 1 g of particulate material. In most cases the specific surface area of the particulate material was also determined by the B.E.T. nitrogen adsorption method. The results obtained are set forth in Table 5 below.

TABLE 5

| Particulate material | Specific Surface area (m$^2$g$^{-1}$) | myoglobin adsorbed (mg.g$^-$) |
|---|---|---|
| Ex.1.-not NaOH treated | 0.3 | 0.26 |
| Ex.1.-NaOH treated | 0.8 | 0.57 |
| Ex.7.-5 meq. 2M2HT per 100 g | — | 0.9 |
| Ex.5.-foamed | 5.1 | 1.2 |
| Ex.6. Portion A-spray dried, not NaOH treated | 0.9 | 0.2 |
| Ex.6. Portion B-spray dried, NaOH treated | 1.5 | 0.7 |
| Ex.6. Portion B coated with 5 meq. 2M2HT per 100 g | — | 0.95 |

These results show that both the specific surface area and the capacity to adsorb protein are increased when the aluminosilicate material consisting predominantly of mullite crystals and silica is treated with concentrated sodium hydroxide solution to dissolve at least part of the silica. A further increase is observed when the aluminosilicate material is prepared from a foamed or spray dried starting material. A still further increase in the capacity to adsorb protein may be achieved by adsorbing about 5 meq. of 2M2HT on the surface of the alkali treated aluminosilicate material thus rendering the surface hydrophobic.

What is claimed is:

1. A particulate porous material wherein substantially all the particles of the material are not smaller than 5 micrometers and not larger than 1 millimeter in diameter and wherein each particle is in the form of a substantially cellular body and consists predominantly of an open, three-dimensional matrix of crystals of mullite which define between them interconnecting pores having a width in the range of from 5 nanometers to about 5 micrometers.

2. A particulate porous material according to claim 1, wherein the substantially cellular body is a substantially spherical hollow particle having an internal cavity with a size in the range of from 1 micrometer to 500 micrometers.

3. A particulate porous material according to claim 1, wherein the substantially cellular body is a substantially rigid foam.

4. A particulate porous material according to claim 3, wherein the substantially rigid foam comprises a plurality of internal cavities each having a size in the range of from 1 micrometer to 500 micrometers.

5. A particulate porous material according to claim 1, wherein substantially all of the particles of the material are not smaller than 10 micrometers and not larger than 100 micrometers.

6. A particulate porous material according to claim 1, wherein the crystals of mullite are substantially uniform in size and the interconnecting pores have a width no greater than about 2 micrometers.

7. A particulate porous material according to claim 1, wherein the crystals of mullite are substantially uniform in size and the interconnecting pores have a width no smaller than 0.1 micrometers.

8. A particulate porous material according to claim 1, wherein the crystals of mullite are substantially uniform in size and the interconnecting pores have a width no smaller than 0.5 micrometers.

9. A particulate porous material according to claim 1, wherein the crystals of mullite have a length in the range of from about 1 micrometer to about 5 micrometers.

10. A particulate porous material wherein substantially all the particles of the material are not smaller than 5 micrometers and not larger than 1 millimeter in diameter and wherein each particle is the form of a substantiallly cellular body and consists predominatly of an open, three-dimensional matrix of crystals of mullite which define between them interconnecting pores having a width in the range of from 5 nanometers to about 5 micrometers, each of said particles having immobilized within the structure thereof a biological component selected from the group consisting of: biological macromolecules and biological cells.

* * * * *